United States Patent [19]
Fu-Tsai

[11] 4,272,973
[45] Jun. 16, 1981

[54] SOCKET JOINT FOR TORQUE WRENCH

[76] Inventor: Lee Fu-Tsai, No. 209-10 Kuang-Ming Rd., Taichung, Taiwan

[21] Appl. No.: 33,431

[22] Filed: Apr. 26, 1979

[51] Int. Cl.³ .............................................. F16D 7/06
[52] U.S. Cl. .......................................... 64/29; 81/475; 192/56 R
[58] Field of Search ............ 64/29; 81/52.4 R, 52.4 A; 192/56 R

[56] References Cited
U.S. PATENT DOCUMENTS

| | | | |
|---|---|---|---|
| 2,250,736 | 7/1941 | Torresen | 81/52.4 R |
| 2,409,545 | 10/1946 | Cornwell | 64/29 |
| 2,764,882 | 10/1956 | Bosworth | 81/52.4 R |
| 3,068,667 | 12/1962 | Sussman | 64/29 |
| 3,205,985 | 9/1965 | Pearl | 81/52.4 R |
| 3,695,059 | 10/1972 | Laubach | 64/29 |
| 3,889,490 | 6/1975 | Nadolny | 64/29 |
| 3,942,337 | 3/1976 | Leonard et al. | 64/29 |
| 4,062,203 | 12/1977 | Leonard et al. | 64/29 |

Primary Examiner—Charles J. Myhre
Assistant Examiner—Magdalgn Moy

[57] ABSTRACT

This invention relates to a socket joint for a torque wrench comprising a joint body, a clutch pressed by a spring thereof, and a controlling means for positioning and clutching said clutch so as to make the joint body keep in a condition of idle running when the torsion occurred exceeds a predetermined value.

14 Claims, 6 Drawing Figures

SOCKET JOINT FOR TORQUE WRENCH

FIELD OF THE INVENTION

Background Of The Invention

This invention provides a socket joint for a torque wrench wherein said socket joint comprising a joint body, a clutch pressed by a spring thereof, and a controlling means for positioning the clutching said clutch. Said socket joint will maintain a state of idle running whenever the torsion applied thereto exceeds a certain limit.

DESCRIPTION OF THE PRIOR ART

The conventional torque wrench is generally provided with no indicating means and which is prone to distort or break a nut of an article when the torsion applied thereto is too great. Conversely, the nut loosens and becomes insecure if the torsion applied does not suffice for the need. For instance, as it is widely known that the spark plugs for automobiles and motorcyles, and fittings for home electrical applicance are in urgent need of proper torsion from a torque wrench.

A torque wrench provided with an indicating disk on a handle thereof and an indicator on a rectangular plug thereof was available quite recently. However, its greatness in size always causes inconvenience to a user; in addition, it requires the user's close attention to the indicating disk and the indicator thereof while being operated. In this case, only a skilled operator can make good use of said torque wrench.

In view of the disadvantages of the known torque wrench, the socket joint for a torque wrench of this invention is provided to overcome the above disadvantages and to comply with today's tendency of "Do it yourself".

SUMMARY OF THE INVENTION

An object of importance of this invention is to provide a socket joint for torque wrenches which will maintain a state of idle running automatically whenever the torsion applied to an article suffices for the need.

Another object of this invention is to provide a socket joint for a torque wrench which may adjust the torsion applied thereto to make it more suitable. A further object of this invention is to provide a socket joint wherein the controlling means being provided to enhance the stability of the socket joint and to prevent the operating and adjusting movements from happening simultaneously.

DETAILED DESCRIPTION OF THE PREFERRED EMBODIMENTS

Figures 1, 6:
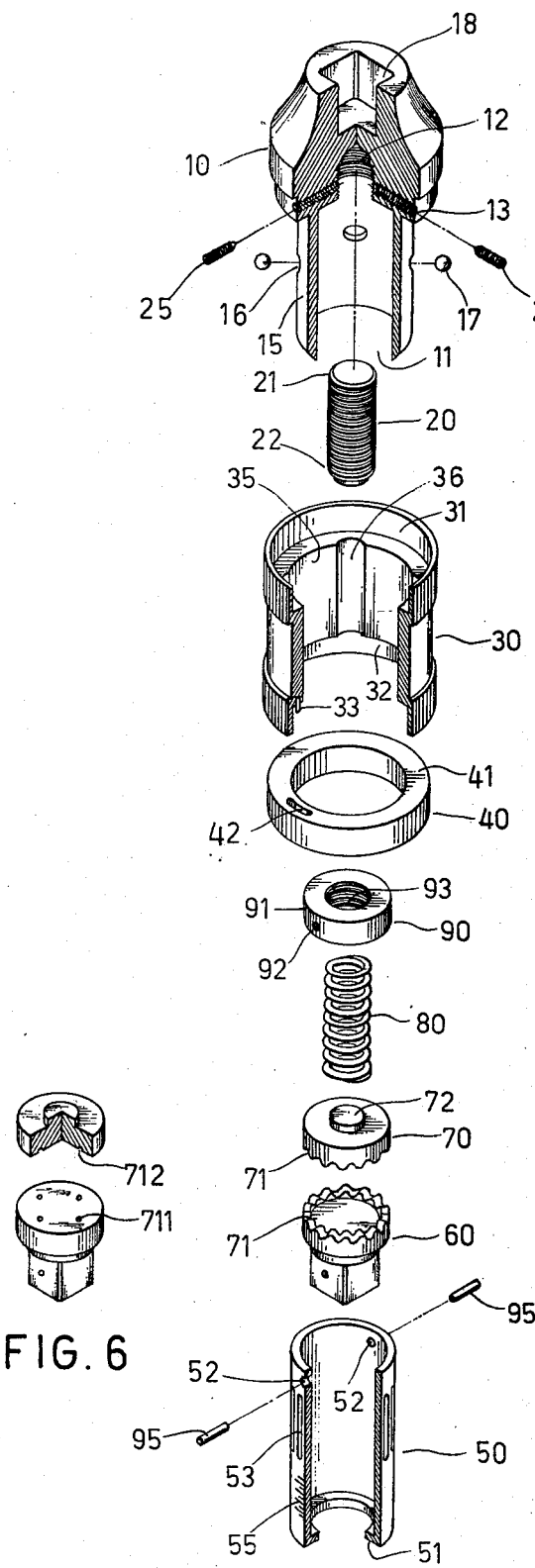
FIG. 1 is an exploded perspective view showing a preferred embodiment of this invention.
FIG. 6 is a exploded perspective view showing the clutch of a further preferred embodiment.

Referring to FIG. 1, the socket joint of this invention comprises a joint body 10, a bolt 20, a rectangular plug 60, a clutch casing 50, a clutch 70, a spring 80, a compressing ring 40, a controlling ring 30 and a positioning nut 90.

The joint body 10 is in the form of a cylinder having a circular chamber 11 situated at its lower end to receive the clutch casing 50. Situated at the end of the circular chamber 11 is a screw hole 12 to engage with one end of said bolt 20; a plurality of small holes 13 are provided on said body 10 near said end of said bolt 20 and said bolt 20 is secured thereto by a plurality of screws 25. A plurality of holes 16 are provided on outer wall 15 of said chamber 11 so as to receive a plurality of beads 17 each having a diameter bigger then thickness of wall of said chamber 11. At upper end of said joint body 10 is provided a rectangular socket 18 so as to receive a rectangular plug of a torque wrench (not shown). The outer periphery of said body 10 is engraved with a plurality of lines 19 (see FIGS. 4 and 5) corresponding to guiding flutes 53 of said clutch casing 50 in number and indicating lines and symbols 55 engraved on outer wall of said casing 50.

Said end of said bolt 20 engages said screw hole 12 as described above; another end thereof engages said positioning nut 90.

Said controlling ring 30 covers the outer wall of said chamber 11 and is provided with two cavity rings 31, 32 at both ends of its inner wall so as to protect said compressing ring 40 wholly and outer wall of said body 10 in part. A protruding pin 33 is provided on said cavity ring 32 to be inserted to an arc-groove 42 situated on an upper surface 41 of said compressing ring 40 so that the controlling ring 30 can only move within a certain distance. Outer wall of said controlling ring 30 is provided with an indicating means 34 (see FIGS. 4 and 5) showing the states of "ON" and "OFF", and inner wall 35 thereof is provided with a plurality of cavity grooves 36 to receive said beads 17. Slanting the rim of each said groove 36 facilitates insertion and removal of said beads 17.

The inner diameter of said compressing ring 40 is equal to outer diameter of said chamber 11 so that said compressing ring 40 may connect with said body 10 tightly; while outer diameter thereof is somewhat smaller than inner diameter of said cavity ring 32 of said controlling ring 30 so as to enable said controlling ring 30 to rotate freely.

Said clutch casing 50 is a hollow round tube provided with a protruding ring 51 at a lower end of its inner wall to receive said rectangular plug 60 and clutch 70. Said positioning nut 90 is secured to said clutch casing 50 by inserting one or more pins 95 through holes 52 and 92 provided on said casing 50 and positioning nut 90 respectively. Said spring 80 is positioned between said bolt 20 and clutch 70. A plurality of guiding flutes 53 are provided on outer wall of said casing 50 to partially receive said beads 17. A plurality of indicating lines and symbols 55 are engraved on outer wall thereof to indicate the strength of torsion applied thereto. Preferably, the length of indicating lines 55 along the axis of clutch casing 50 is shorter than the length of flutes 53.

Said rectangular plug 60 resting against said protruding ring 51 is designed to connect with a socket of an article; one end thereof is provided with a rectangular protrusion and another end thereof is provided with a tooth-like proturberances 71 to engage said clutch 70.

The clutch 70 also is provided with proturberances 71, which, as is shown in FIG. 1, are in the form of symmetrical teeth.

FIG. 6 shows an alternative preferred embodiment of said clutch, one contacting face thereof is provided with a plurality of protrusions 711 while another face thereof is provided with several cavities 712 corresponding to the protrusions 711. A locating means 72 is situated to position said spring 80.

Said positioning nut 90 has a round outer wall 91 provided with two said circular holes 91 to enable it to be secured to said clutch casing 50 as described hereinbefore. Inner wall of said nut is provided with female screw 93 permitting movement of said clutch casing 50 with respect to said body 10 so as to adjust tension of said spring 80 and to adjust the torsion applied thereto.

Figure 3:
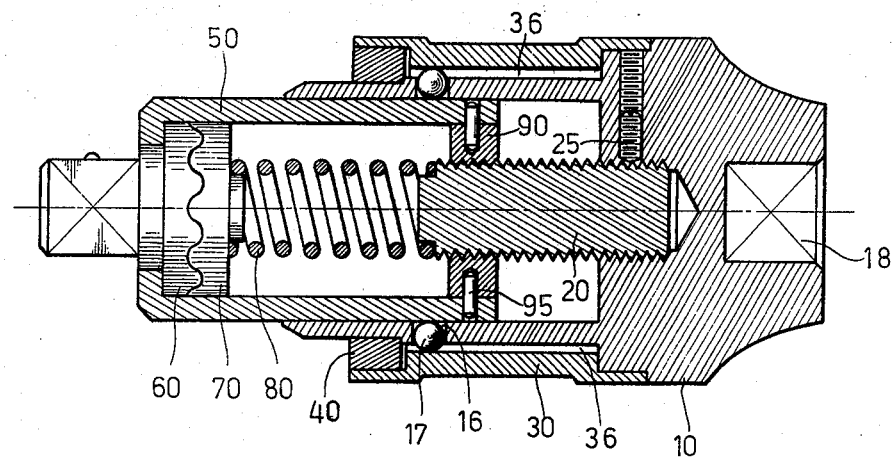
FIG. 3 is a sectional view of another preferred embodiment.
Figure 2:
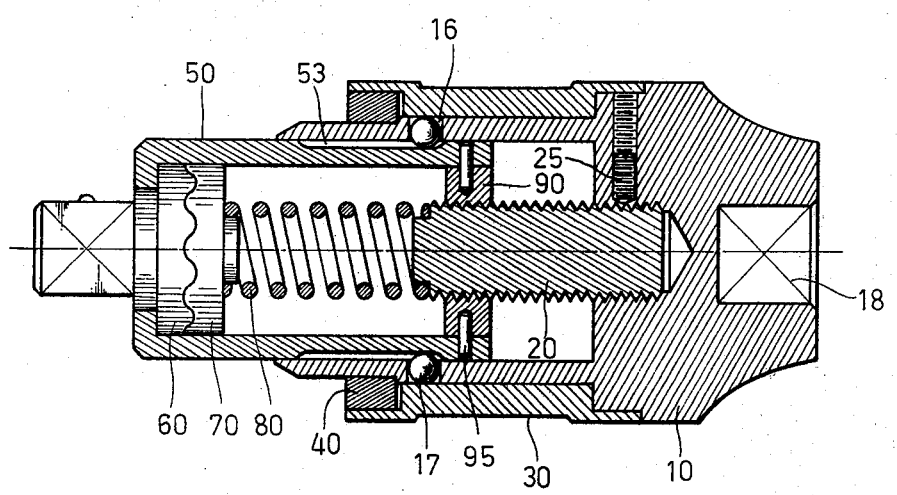
FIG. 2 is a sectional view of the preferred embodiment.
Figures 4, 5:
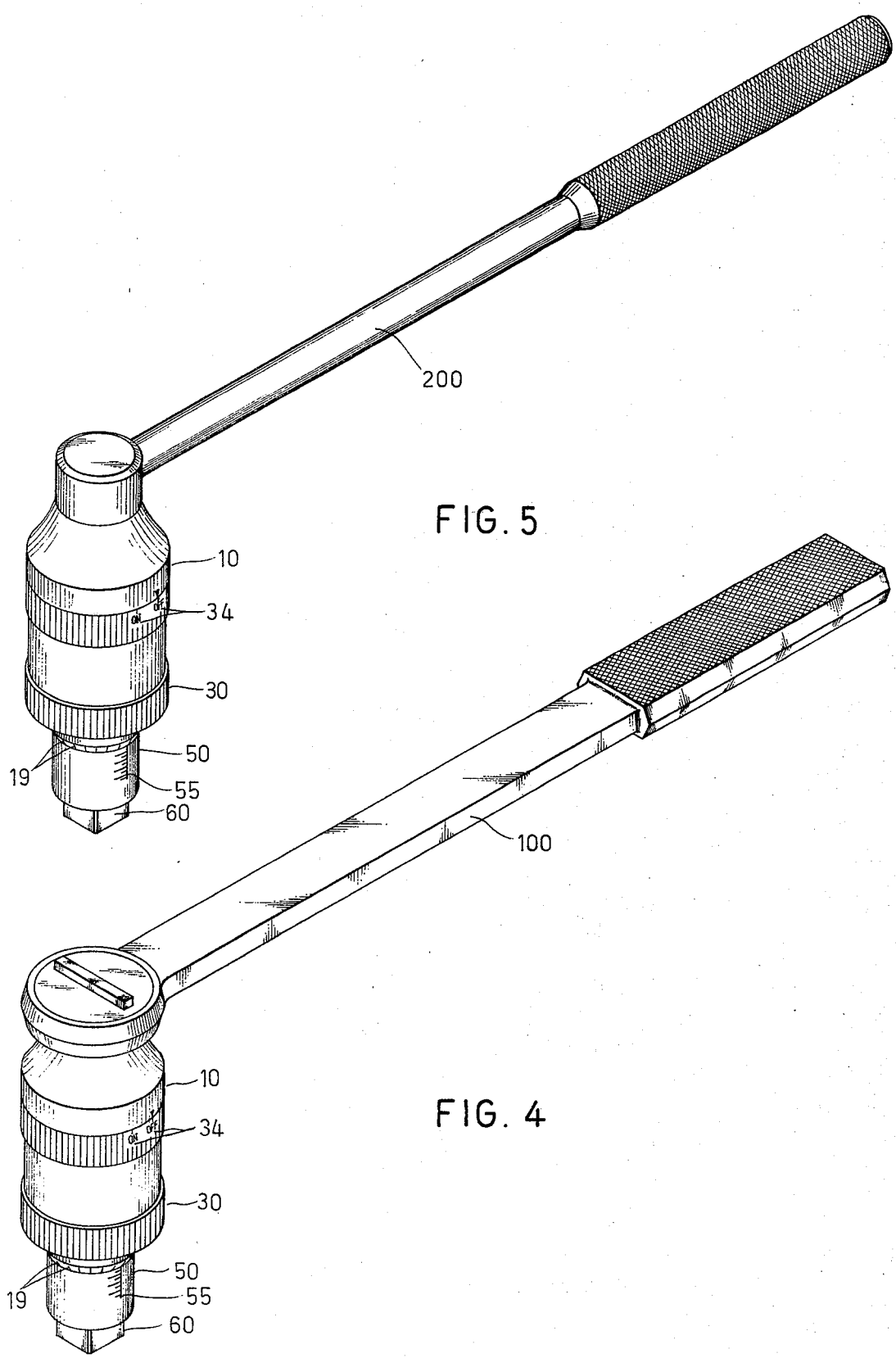
FIG. 4 is a perspective view showing a preferred embodiment of this invention.
FIG. 5 is a perspective view showing a further embodiment of this invention.

Please refer to FIGS. 2, 3 and 4 which show how the socket joint of this invention applies to the torque wrench. A plug of a turning torque wrench 100 is inserted in said rectangular socket 18. Said rectangular plug 60 then engages with a socket of an article requiring torsion. when said controlling ring 30 is rotated to the off indicating means 34, the beads 17 located between said guiding flutes 53 and said holes 16 will move to a position between said holes 16 and said cavity grooves 36 of the controlling ring 30. As shown in FIG. 3, the joint body 10 may rotate with respect to said casing 50; the person using this device may rotate joint body 10 so as to actuate the casing 50 to move towards the joint body 10 and to adjust the elasticity of the spring 80 pressing said clutch 70. The indicating lines and symbols 55 and 19 engraved on said clutch casing 50 and joint body 10 show the strength of the torsion applied thereto. When the desired torsion is being indicated, the controlling ring 30 is rotated to the on indicating means 34 so as to fix the beads 17 to a position between said guiding flutes 53 and said holes 16 (as shown in FIG. 2). The clutch 70 will slip whenever the torsion applied thereto exceeds the indicated amount.

It is to be noted that the pre-decided amount of the torsion may be changed if need be.

The socket joint of this invention is also applicable to a non-turning torque wrench 200 as shown in FIG. 5.

While the described embodiments represent the preferred form of the present invention, it is to be understood that modifications will occur to those skilled in this art without departing from the spirit of the invention. The scope of the invention is therefore to be determined soley by the appended claims.

What is claimed is:

1. An assembly for torque wrenches comprising:
   a body provided with a circular chamber at one end and a rectangular socket at another end;
   a bolt having one end fixed to a central screw hole of said circular chamber;
   a clutch casing, said casing being a circular tube having a protruding ring provided on inner wall of one end thereof;
   a clutching means disposed in said casing, said clutching means including a rectangular plug assembly resting upon said protruding ring;
   a spring positioned between said bolt and clutching means; and
   a positioning nut threaded to said bolt and secured to another end of said clutch casing.

2. The assembly of claim 1, further including a controlling means for selectively permitting said body to rotate with respect to said casing, whereby the position of said positioning nut along said bolt may be changed when desired.

3. An assembly for torque wrenches according to claim 2, wherein said controlling means includes:
   a plurality of guiding flutes provided on outer wall of said clutch casing;
   a plurality of circular holes provided on an outer wall of said circular chamber of said body;
   a controlling ring encasing on outer wall of said circular chamber having a plurality of cavity flutes provided on inner wall thereof;
   a plurality of beads each having a diameter bigger than thickness of wall of said circular chamber, said beads being disposed in the holes in said outer wall and being movable therein to selectively enter said guiding flutes and said cavity flutes.

4. An assembly for torque wrenches according to claim 3, wherein said controlling ring has two cavity rings on inner wall of two ends thereof.

5. An assembly for torque wrenches according to claim 3, further including a compression ring fixed to said body, said compression ring including an arc-groove at one side thereof and wherein one of two said cavity rings situated within said controlling ring is provided with a protruding pin to be inserted in said arc-groove of said compressing ring.

6. An assembly for torque wrenches according to claim 2, wherein said controlling ring is provided with an indicating means on its outer wall.

7. An assembly for torque wrenches according to claim 2, wherein a rim of each said cavity flutes within said controlling means is slightly sloped.

8. An assembly for torque wrenches according to claim 1, wherein said clutch casing is engraved on its outer wall with a length of indicating symbols shorter than length of each of said guiding flutes.

9. An assembly for torque wrenches according to claim 7; wherein said body is provided on its outer periphery with a plurality of indicating symbols corresponding to said indicating symbols engraved on outer wall of said clutch casing.

10. An assembly for torque wrenches according to claim 1, wherein one contacting face of said clutching means is provided with a plurality of protrusions and another one is provided with plurality of corresponding sockets.

11. An assembly for torque wrenches according to claim 1; wherein two contacting faces of said clutching means are in the form of teeth.

12. An assembly for torque wrenches according to claim 10; wherein one of said two contacting faces of said clutching means is integral with said rectangular plug.

13. An assembly for torque wrenches according to claim 12; wherein said clutching means is provided with a positioning device to fix said spring.

14. The assembly of claim 2, further including a compression ring fixed to the circular chamber of said body and wherein said controlling means includes an annular controlling ring rotatably mounted on an outer wall of the circular chamber of said body and said compression ring includes means for limiting the distance which said controlling ring may rotate on the outer wall of said circular chamber.

* * * * *